Patented Sept. 26, 1939

2,173,849

UNITED STATES PATENT OFFICE 2,173,849

INSECTICIDE

Tiffany Lind, Portchester, N. Y., assignor to Lin-Tox Corporation, a corporation of New York No Drawing. Application September 4, 1937, Serial No. 162,427

6 Claims. (Cl. 167—22)

This invention relates to an insecticide and method of preparing and applying it.

One of the important applications of my invention is in the control of the Japanese beetle. This insect has become a serious menace to plant life including fruit trees, shade trees, vegetables and flowers. It has caused widespread and severe economic losses in the fruit growing industry and is also a serious menace to ornamental trees, flowers, vegetables and other plants.

The insecticide of my invention is also effective against other insects including red spider, lacewing fly and aphids.

The problem of devising a satisfactory insecticide for Japanese beetle has existed for a long time and numerous unsuccessful efforts have been made to solve the problem.

A satisfactory spray should possess the following properties:

1. The power of killing the insect rapidly (as distinguished from merely repelling) combined, preferably, with the property of repelling.

2. It should be non-injurious to the plant to which it is applied.

3. It should not leave an unsightly coating or residue on the leaves and other parts of ornamental flowers or other plants.

4. It should be non-toxic to human beings so that its presence on fruit, accidental or otherwise, will not cause poisoning.

5. It should be non-toxic to animals, such as dogs, cats and bird life.

6. The residue left by the spray should be capable of being easily removed by spraying or washing with water.

7. The spray should leave foliage in a bright, glossy condition, because a rough and dirty leaf surface serves as an anchorage for certain insects and larvae, e. g. red spider and its egg masses.

8. The spray should kill rapidly by contact and also, preferably, as a stomach poison, so that the insect will be killed by contact and also by chewing or eating foliage, etc., coated with the spray.

9. The spray should leave a substantially transparent film on foliage, etc., so that the beauty of said foliage, etc., will not be impaired.

My invention meets the above criteria and solves the problem satisfactorily.

My invention and the principles involved therein will be described with the aid of certain specific illustrations. It will be understood that this specific description is intended to act as guide posts or markers to indicate the boundaries of my invention and that no limitation is intended except as ultimately set forth in the claims appended hereto, properly interpreted.

In a typical case I prepare a composition having the following formula:

Example I

|  | Pounds | Percent |
| --- | --- | --- |
| Linseed oil soft potash soap (dry basis) | 10.000 | 21.79 |
| Total water | 35.760 | 77.93 |
| Rotenone (e. g. from derris root) | 0.033 | 0.07 |
| Other derris extractives | 0.098 | 0.21 |
| Total | 45.89 | 100.00 |

The rotenone and other extractives may be obtained by extracting derris root with acetone or other suitable solvent or extracting agent. For example, the derris extractives may be used in the form of an acetone solution containing about 5 per cent rotenone, 15 per cent other extractives and 80 per cent acetone. If such solution is used as such the above formula would contain about 1.12 per cent acetone in lieu of the same per cent of water.

The linseed oil soap is preferably a substantially neutral soap made by saponifying linseed oil with potassium carbonate or hydroxide and therefore contains an equivalent quantity of glycerine. In making such soap an excess of alkali is avoided because excess alkali would be injurious to plant tissue.

In arriving at a composition having the above formula I may proceed by selecting components as follows:

Example 2

Linseed oil soft soap containing 40% soap (dry basis) and 60% water _____ 25 pounds
Derris root extract containing about 5% rotenone, 15% other extractives and 80% acetone ___ 10 fluid ounces
Water _____ 9 quarts and 22 fluid ounces The linseed oil soft soap is dissolved by contact or mixture with the water and into the solution the derris root extract is thoroughly stirred. The result is a substantially clear, viscous, amber colored solution.

For application to exterminate the Japanese beetle it is diluted by mixing one volume with 9 volumes of water and applying the diluted solution with any suitable spray, e. g. of the atomizer type.

In such application it follows that the concentration of active components, based upon the above formula, is as follows:

Example 3

| | Per cent |
|---|---|
| Soap (linseed oil soap) | 2.179 |
| Rotenone | 0.007 |
| Other derris extractives | 0.021 |

For application to the red spider, lacewing fly and aphids, 1 volume of the composition is diluted with 15 volumes of water and in such cases the proportion of active ingredients in the diluted solution is $\frac{1}{16}$ of the concentration in the above formula, or as follows:

Example 4

| | Per cent |
|---|---|
| Soap (linseed soap) | 1.3600 |
| Rotenone | .004 |
| Other derris extractives | 0.013 |

In accordance with my invention certain minimum or critical proportions of ingredients are desirable to secure the most rapid lethal effects. In the case of the Japanese beetle, it will be noted that the proportion of soap is about 2 per cent, rotenone about 0.35 per cent of the quantity of soap used and other extractives about 1 per cent of the quantity of soap, the total proportion of rotenone and other extractives (in respect of the soap) being therefore only about 1.35 per cent of the soap used.

In the case of red spider, lacewing fly and aphids, the soap concentration may be about 1.00 to 1.5 per cent and the proportion of rotenone and other extractives (in relation to the soap) as above set forth.

By employing nicotine in the above formulae in combination with the other ingredients, it is found that the effectiveness is increased in the sense that the minimum concentration of the soap and other constituents to secure lethal effects in a minimum period of time is decreased, i. e. a given weight of the preparation having the composition above set forth will produce a larger volume of spray having at least the same effectiveness. To illustrate, I may incorporate with the components of the formula above set forth in Example 1 a quantity of nicotine sulfate to provide about 0.1 per cent by weight (of the total) of nicotine.

For rapid lethal effect on Japanese beetle I can then dilute this composition with about 19 volumes of water producing a spray having a composition of active ingredients approximately as follows:

Example 5

| | Per cent |
|---|---|
| Linseed oil soft potash soap (dry basis) | 1.000 |
| Rotenone | 0.0035 |
| Other derris extractives | 0.010 |
| Nicotine | 0.005 |

The per cent of the active constituents linseed oil soap, rotenone and derris extractives is therefore about half that shown in Example 3.

It appears therefore that the nicotine exerts an unexpected effect in combination with the other constituents, since although the concentration of soap and derris extractives is reduced to about half, the effectiveness thereof in combination with nicotine remains unimpaired in the sense that the rapidity of lethal effect of the spray of Example 5 is about the same as that of Example 3.

Example 6

Similarly by incorporating nicotine, e. g. about 0.1 per cent, in the formula of Example 1, I can dilute the resulting composition with about 24 volumes of water and obtain a spray having about the same rapidity of lethal effect as that of Example 4, i. e. by employing a spray having active constituents shown by the following approximate percentages (derived by dividing those in Example 1, including about 0.1 per cent nicotine, by 25).

| | Per cent |
|---|---|
| Linseed soap | 0.880 |
| Rotenone | 0.003 |
| Other derris extractive | 0.008 |
| Nicotine | 0.004 |

Instead of nicotine other alkaloidal poisons can be used. Such poisons can of course be omitted in any case where their effect might be toxic to animal or bird life.

One of the important characteristics of my invention is the fact that the preferred soap has such properties that when the spray evaporates, a transparent film is obtained. This is because the soap is so soluble and deliquescent that it does not dry out to a pulverulent residue. The residual film always retains some water and remains transparent.

One means of obtaining a soap having such characteristics is to saponify unsaturated glycerides, e. g. linseed oil, with potassium hydroxide or carbonate. Another means is to neutralize the fatty acids of unsaturated oils with the alkalies mentioned. Thus, potassium linolenate (potassium salt of linolenic acid) and potassium linolate (potassium salt of linolic acid) are soaps of fatty acids derived from linseed oil; and are produced when linseed oil is saponified with potassium hydroxide or carbonate.

The potassium soaps are more soluble in water than soaps of sodium and the more highly unsaturated fatty acids tend to produce soaps more soluble than the saturated fatty acids. Potassium linolenate, the potassium salt of a highly unsaturated fatty acid, is a very soluble deliquescent soap and evaporation of an aqueous solution thereof produces a permanently transparent film.

In general, the "drying" oils, e. g. linseed oil, China-wood oil, poppy seed oil and sunflower oil, etc., upon saponification with a potassium alkali, i. e. hydroxide or carbonate, yield very soft or soluble soaps and of course the fatty acids found in or obtained from such oils, e. g. linolenic acid, linolic acid and elaeomargaric acid, upon treatment with potassium hydroxide or carbonate, also yield soaps of the character mentioned.

When used in accordance with my invention, the soap acts as a contact poison for Japanese beetle, red spider, lacewing fly, aphids and other insect pests. Moreover, it is water soluble and the soaps which I prefer are so soluble that a transparent residue is left upon evaporation of the solution. Therefore one of the principles of my invention is the use of a water soluble contact poison in adequate concentration in aqueous solution, this solution providing a transparent residue upon evaporation. I am therefore not to be limited to the use of soaps as contact poison and may employ any effective contact poison providing it yields a transparent residue on evaporation and otherwise measures up to the criteria above set forth.

The transparency of the residue means that the contact agent remains in solution which is the most effective form and also means that the spray may effectively cover leaves and flowers without in any way deteriorating from their attractiveness and natural appearance.

I claim:

1. An insecticide comprising an aqueous solution of a soap of a drying oil fatty acid, the said soap predominating as the active ingredient of said solution.

2. An insecticide comprising an aqueous solution of a soap of linseed oil fatty acids, the said soap predominating as the active ingredient of said solution.

3. An insecticide comprising an aqueous solution of a soap of a drying oil fatty acid, and a contact poison.

4. An insecticide comprising an aqueous solution of a soap of inseed oil fatty acids, and a contact poison.

5. An insecticide comprising an aqueous solution of a soap of a drying oil fatty acid, and rotenone.

6. An insecticide comprising an aqueous solution of a soap of linseed oil fatty acids, and rotenone.

TIFFANY LIND.